(12) United States Patent
Crafton et al.

(10) Patent No.: US 8,168,718 B2
(45) Date of Patent: May 1, 2012

(54) THERMOPLASTIC VULCANIZATE ADHESIVE COMPOSITIONS

(75) Inventors: Justin Crafton, Wadsworth, OH (US); Weiguo Hu, Hudson, OH (US); Jim Johnson, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1073 days.

(21) Appl. No.: 11/297,936

(22) Filed: Dec. 9, 2005

(65) Prior Publication Data
US 2007/0134497 A1 Jun. 14, 2007

(51) Int. Cl.
C08L 51/00 (2006.01)
C08L 33/04 (2006.01)
C08G 73/02 (2006.01)
B32B 27/00 (2006.01)

(52) U.S. Cl. ............ 525/70; 525/86; 525/185; 428/500

(58) Field of Classification Search .................. 428/500; 525/70, 86, 185
See application file for complete search history.

(56) References Cited

U.S. PATENT DOCUMENTS

| | | | |
|---|---|---|---|
| 3,929,737 A * | 12/1975 | Tazuma et al. | ............... 525/285 |
| 4,957,968 A | 9/1990 | Adur et al. | |
| 5,310,800 A | 5/1994 | Shimizu et al. | |
| 6,503,984 B2 | 1/2003 | Johnson et al. | |
| 2002/0010265 A1 | 1/2002 | Johnson et al. | |

FOREIGN PATENT DOCUMENTS

| | | |
|---|---|---|
| EP | 0 481 789 A | 4/1992 |
| EP | 1 295 926 A | 3/2003 |
| EP | 1 295 936 A | 3/2003 |
| WO | 03/106169 | 12/2003 |
| WO | 2004/044052 | 5/2004 |

OTHER PUBLICATIONS http://books.google.com/books?id=GGGkJdbnt4UC&pg=PA113&lpg=PA113&dq=polar+adhesion+nonpolar&source=bl&ots=Fprd4tcwxE&sig=d7swXfcpW5dTdov21_q8QQcytFs&hl=en& ei=20ihSvj5AuKFmQej2-3eDQ&sa=X&oi=book_result&ct=result&resnum=8#v=onepage&q=polar%20adhesion%20nonpolar&f=false.*

Li Xizhong et al., "*Study on graft $C_5$ petroleum resin with maleic anhydride*", Special Petrochemicals, No. 6, pp. 7-9, 1997.

* cited by examiner

Primary Examiner — Kevin R. Kruer

(57) ABSTRACT

The invention described is a thermoplastic vulcanizate comprising dynamically-cured rubber, a functionalized thermoplastic polymer, and a functionalized hydrocarbon resin, which thermoplastic vulcanizate can be advantageously adhered to a polar substrate, for example by overmolding. In one or more embodiments of the present invention an article of commerce comprising: a) a polar substrate, and the b) a thermoplastic vulcanizate comprised of dynamically-cured rubber, a functionalized thermoplastic polymer, and a functionalized hydrocarbon resin; wherein said thermoplastic vulcanizate is adhered to the polar substrate is provided.

22 Claims, No Drawings

THERMOPLASTIC VULCANIZATE ADHESIVE COMPOSITIONS

FIELD OF THE INVENTION

One or more embodiments of the present invention relate to thermoplastic vulcanizate adhesive compositions including those that contain functionalized tackifier resins.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic matrix. These rubber particles are crosslinked to promote elasticity.

Certain thermoplastic vulcanizates may advantageously be employed as adhesives. Inasmuch as these compositions are melt processable, these compositions may advantageously be applied as a hot-melt adhesive. While these adhesives have proven to be technologically useful, the olefin-rich nature of many thermoplastic vulcanizate compositions may present adhesion issues with polar surfaces such as metal surfaces.

To improve adhesion to polar surfaces, functionalized polymers have been included in thermoplastic vulcanizate compositions. For example, U.S. Pat. No. 4,957,968 teaches the addition of maleated polypropylene to a thermoplastic vulcanizate composition in order to improve adhesion to metal surfaces.

While the inclusion of these functionalized polymers can improve the adhesive properties of thermoplastic vulcanizates, enhanced adhesion has been discovered with the inclusion of soft plastics. For example, U.S. Pat. No. 6,503,984 teaches thermoplastic vulcanizate compositions that include functionalized polyolefins and non-functionalized polyolefins that are characterized by low flexural modulus and low crystallinity.

As the potential uses of soft thermoplastic vulcanizates that adhere to polar surfaces increases, the demands placed upon these compositions likewise increase. For example, thermoplastic vulcanizate adhesive compositions are often employed to provide a desirable surface to many household tools and appliances. For example, many kitchen utensils include soft, grippable surfaces prepared from thermoplastic vulcanizates. In light of these uses, the adhesion of thermoplastic vulcanizates to polar surfaces, especially after water aging, is of particular importance. Also, while good bond strength may be achieved when adhesive compositions are compression molded to a substrate, which advantageous adhesion may derive from a longer residence wetting time, compression molding techniques are often less efficient than injection molding techniques. The ability to achieve good bond strength when injection molding is not trivial, however, which may derive from the shorter residence wetting time that is typically experienced. Therefore, there is also a desire for hot melt adhesives that show good bond strength after injection molding.

SUMMARY OF THE INVENTION

One or more embodiments of the present invention provide a thermoplastic vulcanizate comprising dynamically-cured rubber, a functionalized thermoplastic polymer, and a functionalized hydrocarbon resin.

One or more embodiments of the present invention further provide a method of overmolding a thermoplastic vulcanizate to a polar substrate, the method comprising overmolding a thermoplastic vulcanizate to a polar substrate, where the thermoplastic vulcanizate includes dynamically-cured rubber, a functionalized thermoplastic polymer, and a functionalized hydrocarbon resin.

One or more embodiments of the present invention also provides an article of commerce comprising a) a polar substrate, and b) a thermoplastic vulcanizate comprised of dynamically-cured rubber, a functionalized thermoplastic polymer, and a functionalized hydrocarbon resin wherein said thermoplastic vulcanizate is adhered to said polar substrate.

DETAILED DESCRIPTION OF ILLUSTRATIVE EMBODIMENTS

The thermoplastic vulcanizates of one or more embodiments of the present invention include a functionalized thermoplastic polymer and a functionalized tackifier resin. The thermoplastic vulcanizates of certain embodiments have shown advantageous adhesion to polar surfaces during both initial analysis and after water aging. Also, the thermoplastic vulcanizates of certain embodiments have shown advantageous adhesion to polar surfaces when overmolded to those surfaces.

The thermoplastic vulcanizates of one or more embodiments include a dynamically-cured rubber, a functionalized thermoplastic polymer, and a functionalized tackifier resin. In one or more embodiments, the thermoplastic vulcanizates may optionally include a non-functionalized thermoplastic polymer, as well as other ingredients or constituents that are conventionally employed in thermoplastic vulcanizates. The non-functionalized thermoplastic polymers may include crystalline or semi-crystalline thermoplastic polymers, low-crystallinity thermoplastic polymers, or mixtures thereof. The thermoplastic vulcanizates of this invention may also include other constituents that may be conventionally employed in the manufacture of thermoplastic vulcanizates.

Any rubber or mixture thereof that is capable of being dynamically cured may be used. Reference to a rubber may include mixtures of more than one rubber. Non-limiting examples of useful rubbers include olefinic elastomeric copolymers, butyl rubber, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, and mixtures thereof.

The term olefinic elastomeric copolymer refers to rubbery copolymers polymerized from ethylene, at least one α-olefin monomer, and optionally at least one diene monomer. The α-olefins may include, but are not limited to, propylene, 1-butene, 1-hexene, 4-methyl-1 pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. In the event that the copolymer is prepared from ethylene, α-olefin, and diene monomers, the copolymer may be referred to as a terpolymer or even a tetrapolymer in the event that multiple α-olefins or dienes are used.

In one or more embodiments, the olefinic elastomeric copolymers include from about 12 to about 85% by weight, or from about 20 to about 80% by weight, or from about 40 to about 70% by weight, and or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units (such as propylene) deriving from α-olefin monomer. Expressed in mole percent, the terpolymer of one embodiment includes from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene the olefinic elastomeric copolymer may include at least 6% by weight, in other embodiments at least 8% by weight, and in other embodiments at least 10% by weight units deriving from 5-ethylidene-2-norbornene.

In one or more embodiments, olefinic elastomeric copolymers have a weight average molecular weight ($M_w$) that is greater than 50,000, in other embodiments greater than 1200,000 in other embodiments greater than 200,000, and in other embodiments greater than 300,000; and the weight average molecular weight of the preferred olefinic elastomeric copolymers of one embodiment is less than 1,200,000, in other embodiments less than 1,000,000, in other embodiments less than 900,000, and in other embodiments less than 800,000. In one or more embodiments, useful olefinic elastomeric copolymers have a number average molecular weight ($M_n$) that is greater than 20,000, in other embodiments greater than 60,000, in other embodiments greater than 100,000, and in other embodiments greater than 150,000; and the number average molecular weight of the olefinic elastomeric copolymers of one or more embodiments is less than 500,000, in other embodiments less than 400,000, in other embodiments less than 300,000, and in other embodiments less than 250,000.

In one or more embodiments, olefinic elastomeric copolymers may also be characterized by having a Mooney viscosity ($ML_{(1+4)}$ at 125° C.) per ASTM D 1646, of from about 25 to about 500 or from about 50 to about 450. Where higher molecular weight olefinic elastomeric copolymers are employed within the thermoplastic vulcanizates of this invention, these high molecular weight polymers may be obtained in an oil-extended form. These oil-extended copolymers typically include from about 15 to about 100 parts by weight, per 100 parts by weight rubber, of a paraffinic oil. The Mooney viscosity of these oil-extended copolymers may be from about 35 to about 80 or from about 45 to about 70.

In one or more embodiments, olefinic elastomeric copolymers may be characterized by having an intrinsic viscosity, as measured in Decalin at 135° C., up from about 2 to about 8 dl/g, or from about 3 to about 7 dl/g, or from about 4 to about 6.5 dl/g.

Olefinic elastomeric copolymers may be manufactured or synthesized by using a variety of techniques. For example, these copolymers can be synthesized by employing solution, slurry, or gas phase polymerization techniques that employ numerous catalyst systems including Ziegler-Natta systems, single-site catalysts including vanadium catalysts and Group IV-VI metallocenes, and Brookhart catalysts. Elastomeric copolymers are commercially available under the tradenames Vistalon™ (ExxonMobil Chemical Co.; Houston, Tex.), Keltan™ (DSM Copolymers; Baton Rouge, La.), Nordel™ IP (DuPont Dow Elastomers; Wilmington, Del.), NORDEL MG™ (DuPont Dow Elastomers), Royalene™ (Crompton) and Buna™ (Bayer Corp.; Germany).

In one or more embodiments, the rubber can be highly cured. In one embodiment, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In one embodiment, the rubber has a degree of cure where not more than 10 weight percent, in other embodiments not more than 6 weight percent, in other embodiments not more than 5 weight percent, and in other embodiments not more than 3 weight percent is extractable by cyclohexane at 23° C. as described in U.S. Pat. Nos. 5,100,947 and 5,157,081, which are incorporated herein by reference for purpose of U.S. patent practice. Alternatively, in one or more embodiments, the rubber has a degree of cure such that the crosslink density is preferably at least $4 \times 10^{-5}$, in other embodiments at least $7 \times 10^{-5}$, and in other embodiments at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

The functionalized thermoplastic polymer includes at least one functional group. The functional group, which may also be referred to as a functional substituent or functional moiety, includes a hetero atom. In one or more embodiments, the functional group includes a polar group. Examples of polar groups include hydroxy, carbonyl, ether, halide, amine, imine, nitrile, or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon polymer.

In one or more embodiments, the functionalized thermoplastic polymer may be prepared by grafting a graft monomer to a thermoplastic polymer. The process of grafting may include combining, contacting, or reacting a thermoplastic polymer with a graft monomer. These functionalized thermoplastic polymers include those described in U.S. Pat. Nos. 4,957,968, 5,624,999, and 6,503,984, which are incorporated herein by reference.

The thermoplastic polymer that can be grafted with the graft monomer may include solid, generally high molecular weight plastic materials. These plastics include crystalline and semi-crystalline polymers. In one or more embodiments, these thermoplastic polymers may be characterized by a crystallinity of at least 20%, in other embodiments at least 25%, and in other embodiments at least 30%. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. In these or other embodiments, the thermoplastic polymers to be functionalized may be characterized by having a heat of fusion of at least 40 J/g, in other embodiments in excess of 50 J/g, in other embodiments in excess of 75 J/g, in other embodiments in excess of 95 J/g, and in other embodiments in excess of 100 J/g.

In one or more embodiments, the thermoplastic polymers, prior to grafting, may be characterized by a weight average molecular weight ($M_w$) of from about 100 kg/mole to about 2,000 kg/mole, and in other embodiments from about 300 kg/mole to about 600 kg/mole. They may also characterized by a number-average molecular weight ($M_n$) of about 80 kg/mole to about 800 kg/mole, and in other embodiments about 90 kg/mole to about 200 kg/mole. Molecular weight may be determined by size exclusion chromatography (SEC) by using a Waters 150 gel permeation chromatograph equipped with the differential refractive index detector and calibrated using polystyrene standards.

In one or more embodiments, these thermoplastic polymer, prior to grafting, may be characterized by a melt flow of from about 0.3 to about 2,000 dg/min, in other embodiments from about 0.5 to about 1,000 dg/min, and in other embodiments from about 1 to about 1,000 dg/min, per ASTM D-1238 at 230° C. and 2.16 kg load.

In one or more embodiments, these thermoplastic resins, prior to grafting, may have a melt temperature ($T_m$) that is from about 110° C. to about 250° C., in other embodiments from about 120 to about 170° C., and in other embodiments from about 130° C. to about 165° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° to 115° C.

Exemplary thermoplastic polymers that may be grafted include polyolefins, polyolefin copolymers, and non-olefin thermoplastic polymers. Polyolefins may include those thermoplastic polymers that are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be functionalized.

These homopolymers and copolymers may be synthesized by using an appropriate polymerization technique known in the art. These techniques may include conventional Ziegler-Natta, type polymerizations, catalysis employing single-site organometallic catalysts including, but not limited to, metallocene catalysts, and high-pressure free radical polymerizations.

The degree of functionalization of the functionalized thermoplastic polymer may be recited in terms of the weight percent of the pendent functional moiety based on the total weight of the functionalized polymer. In one or more embodiments, the functionalized thermoplastic polymer may include at least 0.2% by weight, in other embodiments at least 0.4% by weight, in other embodiments at least 0.6% by weight, and in other embodiments at least 1.0 weight percent functionalization, in these or other embodiments, the functionalized thermoplastic polymers may include less than 5% by weight, in other embodiments less than 3% by weight, and in other embodiments less than 2% by weight functionalization.

In one or more embodiments, where the functionalized thermoplastic polymer is a functionalized propylene-based polymer, it can be characterized by a melt flow rate of from about 20 to about 2,000 dg/min, in other embodiments from about 100 to about 1,500 dg/min, and in other embodiments from about 150 to about 750 dg/min, per ASTM D-1238 at 230° C. and 2.16 kg load. In one or more embodiments, where the functionalized thermoplastic polymer is a functionalized ethylene-based polymer, it can be characterized by a melt flow index of from about 0.2 to about 2,000 dg/min, in other embodiments from about 1 to about 1,000 dg/min, and in other embodiments from about 5 to about 100 dg/min, per ASTM D-1238 at 190° C. and 2.16 kg load.

Functionalized thermoplastic polymers are commercially available. For example, maleated propylene-based polymers may be obtained under the tradename FUSABOND™ (DuPont), POLYBOND™ (Crompton), and EXXELOR™ (ExxonMobil).

The functionalized tackifier resin, which may also be referred to as a functionalized hydrocarbon resin, includes at least one functional group. The functional group, which may also be referred to as a functional substituent or functional moiety, includes a hetero atom. In one or more embodiments, the functional group includes a polar group. Examples of polar groups include hydroxy, carbonyl, ether, halide, amine, imine, nitrile, or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon resin.

In one or more embodiments, the functionalized tackifier resins include grafted hydrocarbon resins as disclosed in U.S. Patent Publications Nos. 2004/0260021 A1 and 2004/0266947 A1, which are incorporated herein by reference. Grafted hydrocarbon resins, which may also be referred to as grafted tackifier resins, may include grafted synthetic resins, grafted synthetic oligomers, and/or grafted natural resins, or a combination thereof. Grafted hydrocarbon resins can result from a grafting process, which includes combining, contacting, or reacting a hydrocarbon resin with a graft monomer.

The hydrocarbon resins that may be grafted may include natural resins, synthetic resins, and low molecular weight polymers or oligomers. The monomer that may be polymerized to synthesize the synthetic resins or low molecular weight polymers or oligomers may include those obtained from refinery streams containing mixtures or various unsaturated materials or from pure monomer feeds. The monomer may include aliphatic monomer, cycloaliphatic monomer, aromatic monomer, or mixtures thereof. Aliphatic monomer can include $C_4$, $C_5$, and $C_6$ paraffins, olefins, and conjugated diolefins. Examples of aliphatic monomer or cycloaliphatic monomer include butadiene, isobutylene, 1,3-pentadiene (piperylene) along with 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Aromatic monomer can include $C_8$, $C_9$, and $C_{10}$ aromatic monomer. Examples of aromatic monomer includes styrene, indene, derivatives of styrene, derivatives of indene, and combinations thereof.

Examples of these resins include aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

The synthetic aliphatic or aromatic hydrocarbon resins that can be grafted may be characterized by a number average molecular weight ($M_n$) of from about 400 g/mole to about 3,000 g/mole, and in other embodiments from about 500 g/mole to about 2,000 g/mole. These hydrocarbon resins may also be characterized by a weight average molecular weight ($M_w$) of from about 500 g/mole to about 6,000 g/mole, and in other embodiments from about 700 g/mole to about 5,000 g/mole. Still further, these hydrocarbon resins may be characterized by a Z-average molecular weight of from about 700 g/mole to about 15,000 g/mole, and in other embodiments from about 8,000 g/mole to about 12,000 g/mole. Molecular weight may be determined by size exclusion chromatography (SEC) by using a Waters 150 gel permeation chromatograph equipped with the differential refractive index detector and calibrated using polystyrene standards.

In certain embodiments, the hydrocarbon resins include those produced by thermal polymerization of dicyclopentadiene (DCPD) or substituted DCPD, which may further include aliphatic or aromatic monomers. In one embodiment, the DCPD or substituted DCPD is copolymerized with aromatic monomer, and the final product includes less than 10% aromatic content. In another embodiment, the hydrocarbon resin derives from the copolymerization of both aliphatic monomer and aromatic monomer.

Grafted synthetic oligomers may include dimers, trimers, tetramers, pentamers, hexamers, septamers, and octamers of petroleum distillate monomer. In one or more embodiments, this petroleum distillate monomer may have a boiling point of from about 30° to about 210° C. The oligomers may include byproducts of resin polymerization including thermal and catalytic polymerization. For example, oligomers may derive from processes where DCPD, aliphatic monomer, and/or aromatic monomer are oligomerized and then grafted.

The hydrocarbon resins that can be grafted may include those characterized by an aromatic content of from about 1 to about 60, in other embodiments from about 2 to about 40, and in other embodiments from about 5 to about 10. Also, the hydrocarbon resins that can be grafted may be at least partially hydrogenated. For example, the hydrocarbon resin prior to grafting may contain less than 90, in other embodiments less than 50, in other embodiments less than 25, in other embodiments less than 10, in other embodiments less than 2, in other embodiments less than 1, in other embodiments less than 0.5, and in other embodiments less than 0.05 olefinic protons. Aromatic content and olefin content may be measured by $^1$H-NMR as measured directly from the $^1$H NMR spectrum from a spectrometer with a field strength greater than 300 MHz, and in other embodiments 400 MHz (frequency equivalent). Aromatic content includes the integration of aromatic protons versus the total number of protons. Olefin proton or olefinic proton content includes the integration of olefinic protons versus the total number of protons.

In one or more embodiments, the graft monomers, which may be grafted to the hydrocarbon resin, may include unsaturated organic compounds containing at least one olefinic bond and at least one polar group. In certain embodiments, the organic compound may contain ethylenic unsaturation conjugated with a carbonyl group. Examples of graft monomers include acids, alcohols, anhydrides, imides, amides, and derivatives thereof including carboxylic acids, acid halides or anhydrides, alcohols (phenols, mono-alcohols, diols, and polyols), and derivatives thereof. Representative acids and acid derivatives include carboxylic acids, anhydrides, acid halides, esters, amides, imides and their salts, both metallic and non-metallic. Examples include maleic, fumaric, acrylic, methacrylic, itaconic, aconitic, citraconic, himic, tetrahydrophthalic, crotonic, α-methyl crotonic, and cinnamic acids. Particular examples include maleic anhydride, itaconic anhydride, citraconic anhydride, methyl acrylate, methyl methacrylate, ethyl acrylate, ethyl methacrylate, glycidyl acrylate, monoethyl maleate, diethyl maleate, dibutyl maleate, monomethyl fumarate, dimethyl fumarate, monomethyle itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide, fumaric acid-N,N-dibutylamide, maleimide, N-butylmaleimide, N-phenylamaleimide, sodium acrylate, sodium methacrylate, potassium acrylate and potassium methacrylate.

Grafting of the grafting monomer to the hydrocarbon resin may take place in the presence of a free-radical initiator using suitable conditions. These processes are described in U.S. Patent Publication Nos. 2004/0260021 A1 and 2004/0266947 A1, which are incorporated herein by reference.

In one or more embodiments, the amount of grafting monomer combined with the hydrocarbon resin may be represented as a mole ratio of graft monomer to resin of from about 0.1:1 to about 1:1, in other embodiments from about 0.2:1 to about 0.9:1, and in other embodiments from about 0.3:1 to about 0.8:1. Where the grafting monomer is grafted to an oligomer, the amount of grafting monomer combined with the oligomer may be represented as a mole ratio of graft monomer to oligomer of from about 0.2:1 to about 5:1, in other embodiments from about 0.5:1 to about 3:1, and in other embodiments from about 0.8:1 to about 1.5:1.

The resulting grafted hydrocarbon resin may be characterized by a softening point of from about 15° C. to about 210° C., in other embodiments from about 65° C. to about 170° C., and in other embodiments from about 90° C. to about 140° C. Softening point can be determined according to ASTM E-28 (Revision 1996). In these or other embodiments, the resulting grafted hydrocarbon resin may be characterized by a glass transition temperature of less than 120° C., in other embodiments less than 110° C., and in other embodiment from about 60° C. to about 80° C. Glass transition temperature may be determined according to ASTM D 341-88 by using differential scanning calorimetry. In these or other embodiments, the resulting grafted hydrocarbon resin may be characterized by a Saponification number (mg KOH/g resin material) of greater than 10, in other embodiments greater than 15, and in other embodiments greater than 19. In these or other embodiments, the resulting grafted hydrocarbon resin may be characterized by an acid number greater than 10, in other embodiments greater than 15, and in other embodiments greater than 20, and in other embodiments greater than 25.

Any thermoplastic resin that can be employed in the manufacture of thermoplastic vulcanizates can be used to manufacture the thermoplastic vulcanizates of this invention. Useful thermoplastic resins may include solid, generally high molecular weight plastic resins.

These resins may include crystalline and semi-crystalline polymers. In one or more embodiments, these resins may be characterized by a crystallinity of at least 25% by weight, in other embodiments at least 30% by weight, and in other embodiments at least 35% by weight. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. Where the thermoplastic resin of one or more embodiments is propylene-based, the resins may be characterized by a heat of fusion of at least 50 J/g, in other embodiments in excess of 75 J/g, and in other embodiments in excess of 100 J/g. Where the thermoplastic resins of one or more embodiments are polyethylene-based, they may be characterized by a heat of fusion of at least 85 J/g, in other embodiments at least 100 J/g, and in other embodiments at least 130 J/g.

The non-functionalized thermoplastic polymers may be characterized by a high-flexural modulus. Flexural modulus may be measured according to ASTM-D 790A at 23° C. In one or more embodiments, the non-functionalized thermoplastic polymers may have a flexural modulus that is greater than 200 MPa, in other embodiments greater than 500 MPa, and in other embodiments greater than 2,000 MPa.

In one or more embodiments, useful thermoplastic resins may be characterized by an $M_w$ of from about 50 to about 2,000 kg/mole, and in other embodiments from about 100 to about 600 kg/mole. They are also characterized by an $M_n$ of about 25 to about 1,000 kg/mole, and in other embodiments about 50 to about 300 kg/mole, as measured by GPC with polystyrene standards.

In one or more embodiments, these thermoplastic resins can have a melt flow rate of about 0.5 to 1,000 dg/min, in other embodiments from about 5 to about 500 dg/min, and in other embodiments from about 10 to about 100 dg/min, per ASTM D-1238 at 230° C. and 2.16 kg load.

In one ore more embodiments, these thermoplastic resins can have a melt temperature ($T_m$) that is from about 110° C. to about 250° C., in other embodiments from about 155 to about 170° C., and in other embodiments from about 160° C. to about 165° C. They may have a glass transition temperature ($T_g$) of from about −10 to about 10° C., in other embodiments from about −3 to about 5° C., and in other embodiments from about 0 to about 2° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° to 115° C.

Exemplary thermoplastic polymers include crystalline and semi-crystalline polyolefins, olefin copolymers, and non-olefin resins. The thermoplastic resins may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

The non-functionalized thermoplastic polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one embodiment, the thermoplastic resin includes a high-crystallinity isotactic or syndiotactic polypropylene. This polypropylene can have a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate can be employed. These polypropylene resins are characterized by a melt flow rate that is less than or equal to 10 dg/min, optionally less than or equal to 1.0 dg/min, and optionally less than or equal to 0.5 dg/min per ASTM D-1238 at 2.16 kg load.

The non-functionalized low-crystallinity thermoplastic polymer may include those thermoplastic polymers that may be characterized by a crystallinity that is less than 25%, in other embodiments less than 23%, and in other embodiments less than 20%; in these or other embodiments, the low-crystallinity thermoplastic polymer may be characterized by a crystallinity in excess of 2%, in other embodiments in excess of 3%, and in other embodiments in excess of 5%. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. In one or more embodiments, where the low-crystallinity thermoplastic polymer is propylene-based, the polymer may be characterized by a heat of fusion of less than 50 J/g, in other embodiments less than 40 J/g, and in other embodiments less than 30 J/g. Where the low-crystallinity thermoplastic polymer is ethylene-based, the polymer may be characterized by a heat of fusion of less than 160 J/g, in other embodiments less than 140 J/g, and in other embodiments less than 120 J/g.

The low-crystallinity thermoplastic polymers may be characterized by a low-flexural modulus. Flexural modulus may be measured according to ASTM-D 790A at 23° C. In one or more embodiments, the low-crystallinity thermoplastic polymer may have a flexural modulus of less than 200 MPa, in other embodiments less than 150 MPa, in other embodiments less than 138 MPa, in other embodiments less than 130 MPa, and in certain embodiments from about 120 to about 110 MPa. In view of the foregoing characteristics, the low-crystallinity thermoplastic polymer may also be referred to as low-flex modulus thermoplastic polymer.

In one or more embodiments, these low-crystallinity thermoplastic polymers may be characterized by a melt temperature ($T_m$) that is at least 100° C., in other embodiments at least 110° C., in other embodiments from at least 120° C., and in other embodiments a least 130° C.; in these or other embodiments, the melt temperature may be less than 250° C., and in other embodiments less than 200° C. Melt temperature may be determined by differential scanning calorimetry.

In one or more embodiments, these low-crystallinity thermoplastic polymer may be characterized by a melt flow rate of form about 0.2 to about 1,000 dg/min, in other embodiments form about 0.5 to about 100 dg/min, and in other embodiments from about 1 to about 10 dg/min, per ASTM D-1238 at 230° C. and 2.16 kg load.

Exemplary low-crystallinity thermoplastic polymers include reactor blend polyolefins, impact copolymers, and mixtures thereof. These low-crystallinity thermoplastic polymers may be prepared by copolymerizing ethylene and/or α-olefins. This polymerization may include sequential or in-situ polymerization.

Low-crystallinity thermoplastic polymers are commercially available, for example, impact copolymers having a crystallinity of less than about 25 weight percent may be obtained under the tradename ADFLEX™ KS359P (Basell). Blends that include about 84 weight percent ethylene-propylene rubber, about 5% by weight ethylene propylene copolymer, and about 11 percent by weight random polypropylene, with the overall blend having a crystallinity of about 5 to about 15%, can be obtained under the tradename SOFT-ELL™ CAO2A (Basell).

In certain embodiments, the thermoplastic vulcanizate may include a polymeric processing additive. The processing additive may be a polymeric resin that has a very high melt flow index. These polymeric resins include both linear and branched polymers that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. Thermoplastic vulcanizates that include similar processing additives are disclosed in U.S. Pat. No. 6,451,915, which is incorporated herein by reference for purpose of U.S. patent practice.

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 to about 9,000 g/mole, and in other embodiments from about 700 to about 1,300 g/mole. In one or more embodiments, these oligomers include isobutenyl mer units. Exemplary synthetic oils include polyisobutylene, poly(isobutylene-co-butene), polybutadiene, poly(butadiene-co-butene), and mixtures thereof. In one or more embodiments, synthetic oils may include polylinear α-olefins, poly-branched α-olefins, hydrogenated polyalphaolefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C.; in these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), Indopol™ (BP; Great Britain), and Parapol™ (ExxonMobil). Oligomeric copolymers deriving from butadiene and its comonomers are commercially available under the tradename Ricon Resin™ (Ricon Resins, Inc; Grand Junction, Colo.). White synthetic oil is available under the tradename SPECTRASYN™ (ExxonMobil), formerly SHF Fluids (Mobil).

In one or more embodiments, the extender oils may include organic esters, alkyl ethers, or combinations thereof including those disclosed in U.S. Pat. Nos. 5,290,866 and 5,397,832, which are incorporated herein by reference. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

In addition to the rubber, thermoplastic resins, and optional processing additives, the thermoplastic vulcanizates of the invention may optionally include reinforcing and non-reinforcing fillers, antioxidants, stabilizers, rubber processing oil, lubricants, anti-blocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 percent by weight, in other embodiments at least about 45 percent by weight, in other embodiments at least about 65 percent by weight, and in other embodiments at least about 75 percent by weight rubber. In these or other embodiments, the amount of rubber within the thermoplastic vulcanizates can be from about 15 to about go percent by weight, in other embodiments from about 45 to about 85 percent by weight, and in other embodiments from about 60 to about 80 percent by weight, based on the entire weight of the rubber and thermoplastic combined.

In one or more embodiments, the amount of functionalized thermoplastic polymer within the thermoplastic vulcanizates can be from about 5 to about 60% by weight, in other embodiments from about 10 to about 40% by weight and in other embodiments from about 12 to about 30%, based on the entire weight of the rubber and thermoplastic combined.

In one or more embodiments, the amount of functionalized hydrocarbon resin within the thermoplastic vulcanizates can be from about 0.5 to about 20% by weight, in other embodiments from about 1 to about 15% by weight and in other embodiments from about 2 to about 10%, based on the entire weight of the rubber and hydrocarbon combined.

In one or more embodiments, the amount of non-functionalized thermoplastic polymer within the thermoplastic vulcanizates can be from about 0 to about 50% by weight, in other embodiments from about 5 to about 40% by weight and in other embodiments from about 15 to about 25%, based on the entire weight of the rubber and thermoplastic combined.

In one or more embodiments, the amount of low-crystallinity polyolefin within the thermoplastic vulcanizates can be from about 0 to about 50% by weight, in other embodiments from about 5 to about 40% by weight and in other embodiments from about 15 to about 25%, based on the entire weight of the rubber and thermoplastic combined.

When employed, the thermoplastic vulcanizates may include from about 0 to about 5 parts by weight, or from about 0.1 to about 3 parts by weight, or from about 0.2 to about 2 parts by weight of a polymeric processing additive per 100 parts by weight rubber. Generally, from about 1 to about 50 parts by weight, or from about 2 to about 40 parts by weight, or from about 3 to about 30 parts by weight, of extender oil per 100 parts rubber can be added. The quantity of extender oil added depends upon the properties desired, with the upper limit depending upon the compatibility of the particular oil and blend ingredients; this limit is exceeded when excessive exuding of extender oil occurs. The amount of extender oil depends, at least in part, upon the type of rubber. High viscosity rubbers are more highly oil extendable.

Fillers, such as carbon black, clay, talc, or calcium carbonate may be added in amount from about 1 to about 50, per 100 parts by weight of rubber. The amount of carbon black that can be used depends, at least in part, upon the type of carbon black and the amount of extender oil that is used.

In one or more embodiments, the rubber is cured or crosslinked by dynamic vulcanization. The term dynamic vulcanization refers to a vulcanization or curing process for a rubber contained in a blend with a thermoplastic resin, wherein the rubber is crosslinked or vulcanized under conditions of high shear at a temperature above the melting point of the thermoplastic.

In one embodiment, the rubber can be simultaneously crosslinked and dispersed as fine particles within the thermoplastic matrix, although other morphologies may also exist. Dynamic vulcanization can be effected by mixing the thermoplastic elastomer components (optionally including the functionalized components) at elevated temperature in conventional mixing equipment such as roll mills, stabilizers, Banbury mixers, Brabender mixers, continuous mixers, mixing extruders and the like. Methods for preparing thermoplastic vulcanizates is described in U.S. Pat. Nos. 4,311,628, 4,594,390, 6,503,984, and 6,656,693 which are incorporated herein by reference for purpose of U.S. patent practice, although methods employing low shear rates can also be used. Multiple step processes can also be employed whereby ingredients such as plastics, oils, and scavengers can be added after dynamic vulcanization has been achieved as disclosed in International Application No. PCT/US04/30517, which is incorporated herein by reference for purpose of U.S. patent practice. For example, in one embodiment, the functionalized hydrocarbon resin can be added downstream such as after substantial cure of the rubber has been achieved.

The skilled artisan will be able to readily determine a sufficient or effective amount of vulcanizing agent to be employed without undue calculation or experimentation.

Any cure system that is capable of curing or crosslinking the rubber employed in preparing the thermoplastic vulcanizate may be used. For example, where the rubber includes an olefinic elastomeric copolymer, the cure system may include phenolic resins, free radical curatives, silicon-containing curatives, or other curatives conventionally employed in preparing thermosets.

Despite the fact that the rubber may be partially or fully cured, the compositions of this invention can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 μm, optionally less than 30 μm, optionally less than 10 μm, optionally less than 5 μm, and optionally less than 1 μm. In certain embodiments, at least 50%, optionally at least 60%, and optionally at least 75% of the particles have an average diameter of less than 5 μm, optionally less than 2 μm, and optionally less than 1 μm.

Useful phenolic cure systems are disclosed in U.S. Pat. Nos. 2,972,600, 3,287,440, 5,952,425 and 6,437,030, which are incorporated herein by reference.

In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In one embodiment, a blend of octyl phenol and nonylphenol-formaldehyde resins are employed. The blend includes from about 25 to about 40% by weight octyl phenol and from about 75 to about 60% by weight nonylphenol, more preferably, the blend includes from about 30 to about 35 weight percent octyl phenol and from about 70 to about 65 weight percent nonylphenol. In one embodiment, the blend includes about 33% by weight octylphenol-formaldehyde and about 67% by weight nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which may be referred to as alkylphenol-formaldehyde resins. SP-1045 is believed to be an octylphenol-formaldehyde resin that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a phenolic resin curative includes that defined according to the general formula

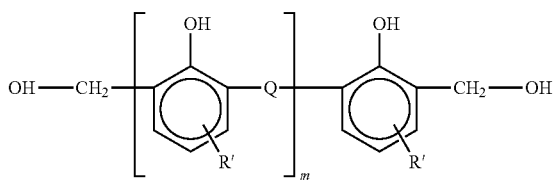

where Q is a divalent radical selected from the group consisting of —$CH_2$—, —$CH_2$—O—$CH_2$—; m is zero or a positive integer from 1 to 20 and R' is an organic group. In one embodiment, Q is the divalent radical —$CH_2$—O—$CH_2$—, m is zero or a positive integer from 1 to 10, and R' is an organic group having less than 20 carbon atoms. In other embodiments, m is zero or a positive integer from 1 to 5 and R' is an organic radical having between 4 and 12 carbon atoms.

It is known that a metal halide or oxide can be used as an accelerator for phenolic resin curatives, e.g., stannous chloride. The stannous chloride can be used in its hydrous ($SnCl_2.H_2O$) or anhydrous ($SnCl_2$) form. The stannous chloride can be used in a powdered, granulated, or flake form. In another embodiment co-agents may be used, for example, metal oxide or other acid reducing compounds, such as zinc oxide.

Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Useful peroxides and their methods of use in dynamic vulcanization of thermoplastic vulcanizates are disclosed in U.S. Pat. No. 5,656,693, which is incorporated herein by reference for purpose of U.S. patent practice.

The free-radical curative may be used in conjunction with a coagent. Useful coagents include high-vinyl polydiene or polydiene copolymer, triallylcyanurate, triallyl isocyanurate, triallyl phosphate, sulfur, N-phenyl bis-maleamide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multifunctional acrylate esters, multi-functional methacrylate eaters or a combination thereof, or oximers such as quinone dioxime.

Silicon-containing cure systems may include silicon hydride compounds having at least two SiH groups. Silicon hydride compounds that are useful in practicing the present invention include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Useful catalysts for hydrosilation include, but are not limited to, peroxide catalysts and catalysts including transition metals of Group VIII. These metals include, but are not limited to, palladium, rhodium, and platinum, as well as complexes of these metals. Useful silicon-containing curatives and cure systems are disclosed in U.S. Pat. No. 5,936,028, which is incorporated herein by reference for purpose of U.S. patent practice.

Where butyl rubber is employed in preparing the thermoplastic vulcanizate, the cure systems may include phenolic resins, silicon-containing cure systems, zinc oxide systems, and amine systems. These cure systems are described in U.S. Pat. Nos. 5,013,793, 5,100,947, 5,021,500, 5,100,947, 4,978,714, and 4,810,752, which are incorporated herein by reference.

The adhesive thermoplastic vulcanizates of this invention may be used in numerous applications. The compositions can be applied to a substrate by using several techniques including, but not limited to, injection molding, extrusion and coextrusion, compression molding, overmolding including insert molding and two-shot molding, blow molding, welding, and thermo forming. In one or more embodiments, the compositions of this invention are employed as a hot melt adhesive.

The substrates to which the compositions can be adhered include numerous polar substrates. Exemplary polar substrates include metal substrates such as aluminum, magnesium, titanium, and copper. The substrates may also include, for example, metal alloys such as stainless steel, carbon steel, thixotropic magnesium (e.g., Thixomat™), and brass. Other polar substrates include, for example, polymeric polar substrates such as nylon (including polyamides, polyimides, and the like) and polycarbonates.

In one or more embodiments, the substrate to which the thermoplastic vulcanizates of this invention may be applied can be treated prior to application of the thermoplastic vulcanizate. Treatment of the substrate may include cleaning of the substrates such as by use of an organic solvent, or chemical treatment such as by way of a primer or compound that can change the characteristics of the surface of the substrate such as the level of oxidation. Other forms of treatment may include physical treatment such as by way of electron beam or annodization. In one or more embodiments, the thermoplastic vulcanizates of this invention may advantageously be applied to a substrate without the need to chemically treat or otherwise alter the chemical nature of the substrate. In one or more embodiments, the thermoplastic vulcanizates of this invention can be applied to a polar substrate, optionally after cleaning the surface of the substrate, but in the absence of any form of chemical treatment such that may alter the chemical nature of the surface of the substrate.

The thermoplastic vulcanizates of this invention may be useful in forming a number of articles or devices of commerce. For example, numerous articles and devices for consumer applications can be prepared. This may include grips or gripable surfaces on a number of consumer goods including, for example, kitchen utensils, tools, toothbrushes, pens and pencils, and athletic equipment. The thermoplastic vulcanizates may also be used in numerous damping applications such as in the formation of gaskets, bumpers, housings, and the like. The thermoplastic vulcanizates may also be useful in numerous industrial applications where it may be desirable to bond elastomeric materials to metal. These applications may include, for example, seals in the automotive and construction industries.

In order to demonstrate the practice of the present invention, the following examples have been prepared and tested. The examples should not, however, be viewed as limiting the scope of the invention. The claims will serve to define the invention.

EXAMPLES

Samples 1-9

Nine thermoplastic vulcanizates were prepared and tested for various properties including adhesion to aluminum both before and after water aging. Each of the thermoplastic vulcanizates were prepared within a twin-screw extruder. Pellets of non-functionalized thermoplastic polyolefin, low-crystallinity polyolefins, functionalized thermoplastic resin, and functionalized hydrocarbon resin were introduced with the EPDM, clay, and zinc oxide to the extruder using a loss-in-weight belt feeder near the beginning of the extruder. As melt blending proceeded, the silicon hydride was added, followed by the addition of the platinum catalyst. The extrusion was set up to reach a melt temperature of about 180° C. to about 220° C. One extruder vent was used as a vacuum port to remove trace volatiles and to prevent porosity in the extruded composition. The compositions were finished into spherical pellets using an underwater pelletizer.

The ingredients common to each of the samples included 100 parts by weight rubber, 100 parts by weight oil, 12 parts by weight filler, 2 parts by weight zinc oxide, 3 parts by weight silicon-containing curative, and 2.5 parts by weight catalyst system. The rubber was poly(ethylene-co-propylene-co-5-vinyl-2-norbornene), which was oil extended in 100 phr oil, and characterized by a Mooney viscosity $ML_{(1+4)}@125°$ C. of about 52, an ethylene mer content of about 63 weight percent, and a vinyl norbornene mer content of 0.7 weight percent. The filler was an anhydrous aluminum silicate obtained under the tradename ICECAP™ K. The silicon-containing curative was silicone hydride obtained under the tradename 2-5084 SIHI™ (Dow Corning). The catalyst was a 0.22 weight percent active platinum catalyst with a cyclic vinyl siloxane ligand in Paralux 6001R oil obtained under the tradename PC085™.

Table I sets forth the various ingredients that were altered in each sample, as well as the results of the various tests that were performed on each sample. The amounts set forth in Table I, as well as all tables set forth herein, are in parts by weight per 100 parts by weight rubber (phr).

Three distinct non-functionalized polyolefin resins were employed in the various samples. While distinct in several respects, these polyolefins have been identified in Table I as either high-flex modulus polyolefins or low-flex modulus polyolefins. The high-flex modulus polyolefin was an impact copolymer containing about 6.4 weight percent ethylene, and characterized by a crystallinity of about 25%, a flexural modulus of about 345 MPa, a melting point of about 120° C., an MFR at 230° C. and 2.16 kg load of about 5 dg/min, and was obtained under the tradename FINAEOD™ 94-21 (Fina). Low-flex modulus Polyolefin I was a polyolefin blend that was believed to include about 27 weight percent reactor copolymer and about 73% by weight of a high propylene impact copolymer, and was characterized by a flexural modulus of about 76 MPa, a Shore D hardness of about 41, a melting point of about 144° C., crystallinity of about 10-20%, an MFR at 230° C. and 2.16 kg load of about 12 dg/min, and was obtained under the tradename ADFLEX™ KS359P (Basell). Low-flex Modulus Polyolefin II was believed to be a polyolefin blend including an impact copolymer having about 4 weight percent ethylene, was characterized by a flexural modulus of about 20 MPa, a Shore A hardness of about 75, melting point peaks at 121° C. and 148° C., crystallinity of 10-15%, an MFR at 230° C. dg/min and 2.16 kg load of about 0.6, a molecular weight of about 280 to about 370 kg/mole, and was obtained under the tradename SOFTELL™ CA02A (Basell). The functionalized thermoplastic polymer was a grafted reactor copolymer including about 1% by weight pendent moieties deriving from maleic anhydride, a melt temperature of about 136° C., and a melt index at 190° C. and 2.16 kg load of about 450 dg/min, and was obtained under the tradename FUSABOND™ PMD353D. The functionalized hydrocarbon resin was a grafted hydrocarbon resin including about 5 weight percent maleation.

Hardness was determined according to ISO 868, ultimate tensile strength, ultimate elongation, and modulus @ 100 was determined according to ASTM D-412. Adhesion was determined by using different procedures for compression molded samples and for insert-molded samples. Specifically, adhesion for insert-molded samples was measured by a peel test modeled after ISO 813. The primary modification was in sample preparation because the thermoplastic composition was directly overmolded to the metal surface without the use of adhesive since adhesion can be obtained at the substrate interface (i.e., no separate adhesive layer exists). For evaluation of insert molding, the metal coupon (in this case aluminum) was wiped with alcohol and pre-heated in an oven to a temperature of 125° C., and then placed in an insert mold with a heater directly behind the metal at a temperature of 125° C.

TABLE I

| | Sample | | | | | | | | |
|---|---|---|---|---|---|---|---|---|---|
| | 1 | 2 | 3 | 4 | 5 | 6 | 7 | 8 | 9 |
| Comparative/Invention | C | C | C | C | C | I | I | I | I |
| High-Flex Modulus Polyolefin | 85.20 | 20.00 | 115.87 | — | — | — | — | — | — |
| Low-Flex Modulus Polyolefin I | 63.90 | 22.81 | — | 115.87 | 4.00 | 117.10 | — | — | — |
| Low-Flex Modulus Polyolefin II | — | — | — | — | 171.87 | — | 117.10 | 117.10 | 117.10 |
| Functionalized Thermoplastic Polymer | 63.90 | 22.81 | 60.00 | 60.00 | 60.00 | 64.00 | 64.00 | 64.00 | 64.00 |
| Functionalized Tackifier Resin | — | — | — | — | — | 32.00 | 32.00 | 32.00 | 32.00 |
| Hardness (Shore A) | 87 | 63 | 82 | 65 | 68 | 70 | 66 | 62 | 65 |
| Ultimate Tensile Strength (MPa) | 11.8 | 7.1 | 7.2 | 5.4 | 6.1 | 6.1 | 5.0 | 6.0 | 6.0 |
| Ultimate Elongation (%) | 805 | 494 | 664 | 605 | 684 | 710 | 763 | 860 | 740 |
| 100% Modulus (MPa) | 4.3 | 2.4 | 3.6 | 2.4 | 2.4 | 2.5 | 2.1 | 2.0 | 2.1 |
| Initial Peel @ RT (Compression Molded) (kN/m) | 16.8 | 7.5 | 12.8 | 7.9 | 12.3 | 8.4 | 9.6 | 11.9 | 10.9 |
| Initial Peel @ RT (Insert Molded) (kN/m) | 4.0 | 1.1 | 5.3 | 1.6 | 2.6 | 3.7 | 3.5 | 4.0 | 3.3 |
| Aged in $H_2O$ (168 hr@RT) (Insert Molded) (kN/m) | 2.3 | 0.5 | 3.9 | 1.8 | 2.3 | 4.4 | 3.5 | 4.0 | 3.5 |

The molten composition was then injection molded onto the metal coupon at a melt temperature of 260° C. A standard tensometer was then used to measure peel values for the sample by clamping the edges of the metal coupon in a fixture and placing the end of the attached thermoplastic elastomer strip in the upper grip of the tensometer. The grips were then pulled apart at an angle 180°. The force to peel was plotted against the crosshead travel, which is also the peel length down the profile. The curve typically reached a peak and then descended to a plateau. The plateau values were recorded as the adhesion, expressed as kilo Newton per meter (kN/m).

Adhesion to compression molded samples was measured by a peel test modeled after ASTM D-903-98. The only differences to this method were in Sample preparation and conditioning. The compositions bonded to the metal substrates without the use of adhesives, and the samples were prepared by compression molding the adhesive compositions onto pre-cut strips of aluminum that were about 0.25 mm thick at a temperature of about 218° C. for about 5 minutes. The samples were conditioned for a minimum of 24 hours versus 7 days as specified by the ASTM D903-98 method.

The data in Table I shows that samples according to the present invention (i.e., Samples 6-9) were soft and yet demonstrated technologically useful adhesion both before and after water aging. The comparative samples were harder and/or did not show a balance of comparable adhesion before and after water aging.

Samples 10-12

Three additional thermoplastic vulcanizates were prepared and tested in a similar fashion to the proceeding samples. The distinguishing ingredients are set forth in Table II along with the results of various tests. It is noted that Samples 11 and 12 included 3 parts by weight catalyst system.

TABLE II

| | Sample | | |
|---|---|---|---|
| | 10 | 11 | 12 |
| Comparative/Invention | I | C | C |
| Low-Flex Modulus Polyolefin II | 149.00 | 149.00 | 149.00 |
| Functionalized Thermoplastic Resin | 32.00 | 32.00 | — |
| Functionalized Hydrocarbon Resin | 32.00 | — | 32.00 |
| Hardness (Shore A) | 58 | 59 | 46 |
| Ultimate Tensile Strength (MPa) | 5.6 | 5.6 | 4.8 |
| Ultimate Elongation (%) | 803 | 639 | 742 |
| 100% Modulus (MPa) | 1.7 | 2.0 | 1.2 |
| Initial Peel @ RT Insert Molded (kN/m) | 2.8 | 0.7 | <1.2 |
| Aged in H$_2$O (168 hr@RT) Insert Molded (kN/m) | 3.2 | — | — |

The data in Table II suggests that advantageous results are achieved when the formulation includes both a functionalized thermoplastic resin and a functionalized hydrocarbon resin. Where either of these components are absent, the thermoplastic vulcanizates did not show desired adhesion.

Samples 13-17

Five additional thermoplastic vulcanizate samples were prepared in a Brabender mixer at 180° C. and 150 rpm. The ingredients were similar to those employed in the previous samples, except that Samples 13 and 14 employed a functionalized tackifier resin, Samples 15 and 16 employed an un-functionalized tackifier resin, and Sample 17 did not include a tackifier resin. The amount of tackifier resin employed in the samples, together with the results of adhesion testing, are set forth in Table III.

TABLE III

| | Sample | | | | |
|---|---|---|---|---|---|
| | 13 | 14 | 15 | 16 | 17 |
| Comparative/Invention | I | I | C | C | C |
| Low-Flex Modulus Polyolefin II | 149 | 149 | 149 | 149 | 149 |
| Functionalized Tackifier Resin | 8.2 | 34.9 | — | — | — |
| Unfunctionalized Tackifier Resin | — | — | 34.9 | 76.4 | — |
| Initial Peel @ RT Insert Molded (kN/m) | 2.45 | 4.03 | 2.28 | 2.28 | 1.93 |
| Aged in H$_2$O (168 hr@RT) Insert Molded (%) | 100 | 78 | 92 | 100 | 73 |

The thermoplastic vulcanizate samples were compression molded to metal coupons (i.e., substrates) in a manner similar to that employed in Samples 1-9, except that 304 stainless steel coupons were used, and molding took place at a temperature of 204-218° C. for one minute followed by 10 minutes of water cooling. Analysis of these samples took place in a manner similar to that employed for the compression molded samples above. It is noted that the aged peel values are reported as a percentage of the difference of the original and aged peel.

The data in Table III shows that the use of the functionalized tackifier resin provides adhesion benefits beyond that offered by un-functionalized tackifier resins. Notably, greater amounts of un-functionalized tackifier resin are required to achieve results comparable to the samples that included functionalized tackifier resin. This is particularly significant in view of the conditions employed to prepare the molded samples. That is, those skilled in the art appreciate that greater adhesion strength can be achieved by compression molding, and therefore one skilled in the art would expect less distinction between various samples that are compression molded.

Various modifications and alterations that do not depart from the scope and spirit of this invention will become apparent to those skilled in the art. This invention is not to be duly limited to the illustrative embodiments set forth herein.

What is claimed is:

1. A thermoplastic vulcanizate comprising:
   dynamically-cured rubber comprising an elastomeric copolymer, where the elastomeric copolymer is a terpolymer polymerized from ethylene, propylene, and nonconjugated diene monomer;
   from about 5 to about 40% by weight of a non-functionalized propylene-based thermoplastic polymer characterized by a crystallinity in excess of 2% and less than 25%, a flexural modulus, per ASTM D-790A at 23° C., less than 150 MPa, a melt temperature of at least 100° C. and less than 250° C., and a melt flow rate, per ASTM D-1238 at 230° C. and 2.16 kg/load, of about 0.2 to about 1,000 dg/min.;
   from about 5 to about 60% by weight of a maleated propylene-based polymer having a melt flow rate from about 20 to about 2,000 dg/min per ASTM D-1238 at 230° C. and 2.1 kg load and the maleated polypropylene-based polymer has at least 0.2% by weight functionalization; and
   from about 0.5 to about 20% by weight of a functionalized tackifier resin comprising a maleated hydrocarbon resin, based on the total weight of the rubber and thermoplastic polymer combined, where the functionalized tackifier resin is characterised by a softening point of from about 15° C. to about 210° C., as determined by ASTM E-28 (Rev. 1996), a glass transition temperature of less than 120° C., as determined by ASTM D 341-88 by DSC, a saponification number of greater than 10, and an acid number of greater than 10.

2. The thermoplastic vulcanizate of claim 1, where the non-functionalized thermoplastic polymer is characterized by a crystallinity in excess of 5% and less than 20%, a flexural modulus, per ASTM D-790A at 23° C., less than 110 MPa, a melt temperature of at least 120° C. and less than 200° C., and a melt flow rate, per ASTM D-1238 at 230° C. and 2.16 kg/load, of about 1 to about 10 dg/min.

3. The thermoplastic vulcanizate of claim 1, where the thermoplastic vulcanizate comprises from about 10 to about 40% by weight of the functionalized thermoplastic polymer, from about 1 to about 15% by weight of the functionalized hydrocarbon resin, and from about 15 to about 25% by weight of the non-functionalized thermoplastic polymer, based on the total weight of the rubber and thermoplastic polymer combined.

4. The thermoplastic vulcanizate of claim 1, where the non-functionalized propylene-based thermoplastic polymer includes a propylene impact copolymer.

5. The thermoplastic vulcanizate of claim 1, where the non-functionalized propylene-based thermoplastic polymer has a heat of fusion that is less than 50 j/g.

6. The thermoplastic vulcanizate of claim 1, where the tackifier resin has a number average molecular weight of from about 400 g/mole to about 3,000 g/mole.

7. The thermoplastic vulcanizate of claim 1, where the maleated hydrocarbon resin is a maleated resin selected from the group consisting of aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

8. The thermoplastic vulcanizate of claim 1, where the rubber has a number average molecular weight of from 100,000 to 400,000.

9. The thermoplastic vulcanizate of claim 8, where the dynamically-cured rubber is cured to an extent where not more than six weight percent of the rubber is extractable by cyclohexane at 23° C.

10. The thermoplastic vulcanizate of claim 1, where said rubber is dynamically cured by employing a silicon-containing catalyst.

11. The thermoplastic vulcanizate of claim 1, where the functionalized tackifier resin is a grafted tackifier resin and includes a grafted synthetic hydrocarbon resin, a grafted synthetic oligomer, a grafted natural resin, or a combination thereof.

12. The thermoplastic vulcanizate of claim 11, where said grafted tackifier resin results from combining, contacting, or reacting a tackifier resin with a graft monomer.

13. The thermoplastic vulcanizate of claim 11, where said grafted tackifier resin results from combining a grafting monomer with a hydrocarbon resin in a mole ratio of from about 0.1:1 to about 1:1.

14. The thermoplastic vulcanizate of claim 11, where said grafted tackifier resin results from combining a grafting monomer with a oligomer in a mole ratio of from about 0.2:1 to about 5:1.

15. The thermoplastic vulcanizate of claim 1, where the vulcanizate is formed into a gripable surface on goods selected from kitchen utensils, tools, toothbrushes, pens and pencils, and athletic equipment.

16. An article of commerce comprising:
a) a polar substrate; and
b) the thermoplastic vulcanizate of claim 1.

17. A thermoplastic vulcanizate comprising:
dynamically-cured rubber comprising an elastomeric copolymer, where the elastomeric copolymer is a terpolymer polymerized from ethylene, propylene, and nonconjugated diene monomer;
from about 5 to about 40% by weight of a non-functionalized propylene-based thermoplastic polymer characterized by a crystallinity in excess of 2% and less than 25%, a flexural modulus, per ASTM D-790A at 23° C., less than 150 MPa, a melt temperature of at least 100° C. and less than 250° C., a melt flow rate, per ASTM D-1238 at 230° C. and 2.16 kg/load, of about 0.2 to about 1,000 dg/min., and a heat of fusion that is less than 50 j/g;
from about 5 to about 60% by weight of a maleated propylene-based polymer having a melt flow rate from about 20 to about 2,000 dg/min per ASTM D-1238 at 230° C. and 2.1 kg load and the maleated polypropylene-based polymer has at least 0.2% by weight functionalization; and
from about 0.5 to about 20% by weight of a functionalized tackifier resin comprising a maleated hydrocarbon resin, based on the total weight of the rubber and thermoplastic polymer combined.

18. A thermoplastic vulcanizate comprising:
dynamically-cured rubber comprising an elastomeric copolymer, where the elastomeric copolymer is a terpolymer polymerized from ethylene, propylene, and nonconjugated diene monomer, and where the rubber, prior to curing, has a number average molecular weight of from 100,000 to 400,000;
from about 5 to about 40% by weight of a non-functionalized propylene-based thermoplastic polymer characterized by a crystallinity in excess of 2% and less than 25%, a flexural modulus, per ASTM D-790A at 23° C., less than 150 MPa, a melt temperature of at least 100° C. and less than 250° C., and a melt flow rate, per ASTM D-1238 at 230° C. and 2.16 kg/load, of about 0.2 to about 1,000 dg/min.;
from about 5 to about 60% by weight of a maleated propylene-based polymer having a melt flow rate from about 20 to about 2,000 dg/min per ASTM D-1238 at 230° C. and 2.1 kg load and the maleated polypropylene-based polymer has at least 0.2% by weight functionalization; and
from about 0.5 to about 20% by weight of a functionalized tackifier resin comprising a maleated hydrocarbon resin, based on the total weight of the rubber and thermoplastic polymer combined.

19. The thermoplastic vulcanizate of claim 18, where the dynamically-cured rubber is cured to an extent where not more than six weight percent of the rubber is extractable by cyclohexane at 23° C.

20. The thermoplastic vulcanizate of claim 18, where said rubber is dynamically cured by employing a silicon-containing catalyst.

21. The thermoplastic vulcanizate of claim 18, where the tackifier resin has a number average molecular weight of from about 400 g/mole to about 3,000 g/mole.

22. The thermoplastic vulcanizate of claim 18, where the maleated hydrocarbon resin is a maleated resin selected from the group consisting of aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

* * * * *